March 25, 1930.  C. L. BURRIGHT ET AL  1,752,060

WATER FILTER

Filed April 20, 1927

INVENTOR
Charles L. Burright
Gulois J. Snyder
John A. Naismith
ATTORNEY

Patented Mar. 25, 1930

1,752,060

UNITED STATES PATENT OFFICE

CHARLES L. BURRIGHT AND MELVIN J. SNYDER, OF CAMPBELL, CALIFORNIA

WATER FILTER

Application filed April 20, 1927. Serial No. 185,238.

Our invention relates particularly to that type of filters wherein the water is filtered from a receptacle through a filter bed into an olla positioned therebelow.

It is one object of our invention to provide a filter of the character indicated provided with means for automatically controlling the flow of water from the receptacle into the olla.

It is another object of the invention to provide means for automatically regulating the quantity of water in the receptacle.

It is still another object of the invention to provide a filter of the character indicated so constructed and arranged that the water has a direct path of travel between the receptacle and olla.

It is also an object of the invention to provide a novel means for cooling the water before it passes into the olla.

It is still a further object of the invention to provide a simple and highly efficient filtering medium in the receptacle, and one that is quickly and easily cleaned or replaced, with quickly and easily assembled and disassembled fastening means.

Figure 1:
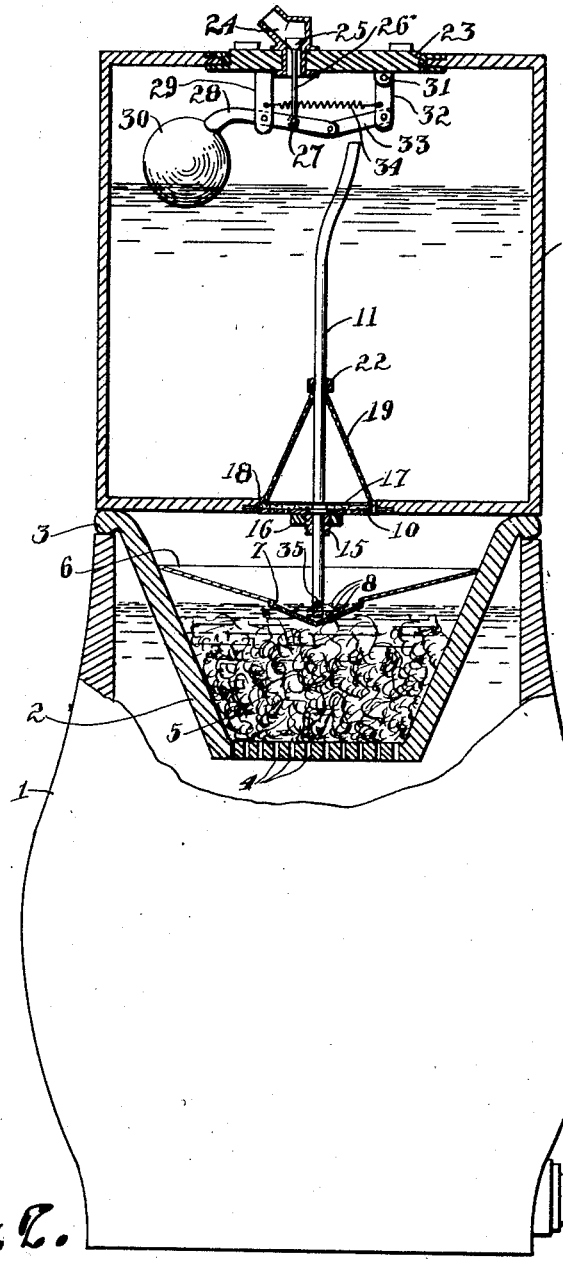
Figure 1 is a vertical section through a device embodying my invention, partly in elevation.
Figure 2:
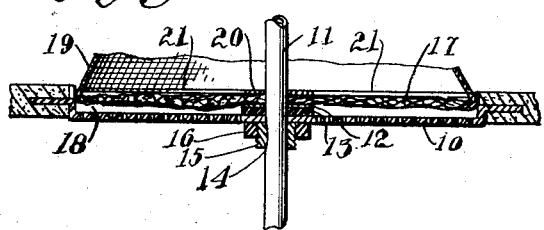
Figure 2 is an enlarged section through a portion of the receptacle and the filtering medium therein.

Referring now more particularly to the drawing, we show at 1 an olla of the type commonly used in filters of the type indicated.

At 2 is shown a filtering bowl provided with a flange 3 adapted to rest upon the upper edge of the olla and provided with orifices 4 in its bottom. A suitable filtering material is placed therein as at 5.

At 6 is shown a concave metal disc of such a size as to fit snugly in the bowl 2 a distance below its upper edge and above the filtering material therein, the said disc having a recess 7 formed at its apex and provided with orifices 8.

A receptacle is shown at 9 for containing a quantity of water to be filtered, and in the bottom of this receptacle is mounted a perforated plate 10. The tube 11 passes vertically through the center of this plate and extends from a point immediately over the bottom of recess 7 to a point above the high water level in the receptacle as shown. On the pipe or tube 11 is mounted a disc 12 and between the disc 12 and the plate 10 is positioned a rubber disc 13. The tube 11 is slightly flattened as at 14 to receive a threaded collar 15, the engaging flattened surfaces preventing relative rotation thereof. A nut 16 is threaded on to the collar 15. In assembling these parts the rubber disc 13 is mounted on the tube to seat against disc 12 and the tube is passed through the plate 10, after which the collar 15 is placed in position and the nut 16 threaded thereon to bind against the bottom of plate 10, thereby securing the parts in position.

A porous asbestos disc is shown at 17 having a diameter slightly greater than the diameter of the upper surface of plate 10 so that when it is pressed down into the recess 18 formed by the said plate 10 and the bottom of receptacle 9 it will snugly engage the sides thereof.

A primary filtering screen in the form of a cone is shown at 19 centered upon tube 11 by means of a disc 20 and connecting bars 21 mounted upon its lower edge, the diameter of the bottom of the cone being slightly less than that of the recess 18 whereby to apply the necessary pressure to the asbestos disc 17 to secure the snug fitting above referred to. The upper end of the cone 19 fits closely about the tube 11, and the cone is held in position by means of a rubber element 22 slidably mounted on the tube as shown. When these parts are assembled as set forth the rubber element 22 effectually prevents water from entering the cone at its upper end, so that to effect its escape from the receptacle the water must first pass through the cone 19 and then through the asbestos filter pad 17 and perforated plate 10.

Assuming that a quantity of water has been placed in receptacle 9, all coarser material is filtered therefrom in its passage through the cone 19, and the foreign material passing through the cone is filtered out by the asbestos disc 17. The filtered water drops upon the metal disc 6, being aerated and cooled in its passage thereto and still further cooled as it finds its way to the orifices 8. Dropping into the bowl 2 the water is purified by the material 5 as it passes directly therethrough to orifices 4 and thence into the olla.

In order to maintain a suitable quantity of water in the receptacle 9 I provide the following mechanism.

A cap 23 is threaded into the top of the receptacle as shown and provided with an inlet 24 which may be connected in any suitable manner with a constant source of water supply, and in this inlet is placed a valve 24 with a depending stem 26. The stem 26 is connected to a slot 27 in a lever 28 pivotally mounted on a bracket 29 depending from cap 23, the lever 28 carrying a float 30. To a lug 31 on the under side of cap 23 is pivotally connected a link 32, and to the link 32 is pivotally connected a second link 33 which is also pivotally connected to the lever 28 as shown. Bracket 29 and link 32 are connected by a spring 34. When the water reaches a given level it operates lever 28 to close the valve 24. When the water level drops the lever is actuated to open the valve.

By means of the tube 11 the water is maintained at a given height in the olla, because when it drops below a given level air is admitted to the tube and the receptacle 9 thereby allowing water to flow out of the receptacle, but when the tube is closed by the water in the olla the interior of the receptacle is entirely closed off from the atmosphere.

In tube 11 a short distance above its lower end is formed a small orifice 35, of less diameter than the inner diameter of the tube 11. Due to the difference in air pressures in receptacle 9 and olla 1, when the water rises in the olla and closes off the lower end of the tube it will rise a distance therein. When the water level in the olla drops below the end of the tube this water plug will frequently be held in place, the suction at the upper end of the tube being insufficient to draw it therethrough. But when the orifice 35 is provided air is drawn through it as soon as it is uncovered thereby equalizing the air pressure on both sides of the plug and allowing it to drop out. Due to the small size of the orifice the water will not rise above it in the tube to any appreciable extent.

It is to be understood, of course, that while we have herein shown and described but one specific embodiment of the invention, changes in form, construction, and method of assembly and operation may be made within the scope of the appended claims.

We claim:

1. A water filter comprising an olla, a receptacle mounted thereon having a perforated bottom portion and closed at its top, a tube passing through the perforated bottom portion into the olla and extending upwardly to a point adjacent the top of the receptacle, a filtering pad covering the perforated bottom portion, a foraminous cone mounted on said pad and encompassing said tube, and means mounted on the tube for engaging the apex of the cone and pressing it into engagement with the edge of the pad.

2. A water filter comprising an olla, a receptacle mounted thereon having a perforated bottom portion and closed at its top, a tube passing through the perforated bottom portion into the olla and extending upwardly to a point adjacent the top of the receptacle, securing means mounted on the tube to engage the bottom of the receptacle, a filtering pad covering the perforated bottom portion, a foraminous cover for the pad encompassing said tube, and a resilient collar slidably mounted on the tube to engage the top of the cover.

3. A water filter comprising an olla, a filter bowl having a perforated bottom suspended therein, a perforated dished plate positioned in said bowl, a water receptacle mounted on the olla, filtering means mounted on the bottom of the receptacle to discharge on to said plate, and a tube extending from a point adjacent the upper surface of said plate to a point adjacent the top of said receptacle, the top of said receptacle being closed.

4. A water filter comprising an olla, a closed water receptacle having a bottom portion adapted to permit the passage of water therethrough mounted on the olla, a tube extending from the olla upwardly through the bottom of the receptacle, a conical element adapted to permit the passage of water therethrough mounted on said tube and the said water-permeable portion of the bottom of the receptacle, means for preventing upward movement of the tube, and means slidably mounted on the tube to engage the apex of the cone and press it into close engagement with the bottom of the receptacle.

CHARLES L. BURRIGHT.
MELVIN J. SNYDER.